United States Patent [19]

Golding et al.

[11] Patent Number: 5,265,163
[45] Date of Patent: Nov. 23, 1993

[54] COMPUTER SYSTEM SECURITY DEVICE

[75] Inventors: Victor G. Golding, Ower. Romsey; Gregor H. Speirs, Winchester, both of United Kingdom

[73] Assignee: International Business Machines Corp., Armonk, N.Y.

[21] Appl. No.: 516,890

[22] Filed: Apr. 30, 1990

[30] Foreign Application Priority Data

Jan. 17, 1990 [EP] European Pat. Off. ......... 89313063.3

[51] Int. Cl.⁵ ............................................. H04L 9/00
[52] U.S. Cl. ............................................. 380/25; 380/4
[58] Field of Search ............................... 380/23, 25, 4; 340/825.31, 825.34

[56] References Cited

U.S. PATENT DOCUMENTS

| | | | |
|---|---|---|---|
| 4,757,533 | 7/1988 | Allen et al. | 380/25 |
| 5,012,514 | 4/1991 | Renton | 380/4 |
| 5,058,164 | 10/1991 | Elmer et al. | 380/4 |
| 5,115,508 | 5/1990 | Hatta | 380/4 |
| 5,204,966 | 4/1993 | Wittenberg et al. | 380/25 |

OTHER PUBLICATIONS

IBM Technical Disclosure Bulletin, vol. 30, No. 2, Jul. 1987, pp. 725-726, Personal Computer Security Device.
IBM Technical Disclosure Bulletin, vol. 28, No. 6, Nov. 1985, pp. 25-30, Method of Protecting Data on PC.
IBM Technical Disclosure Bulletin, vol. 29, No. 8, Jan. 1987, pp. 3431-3432.

Primary Examiner—Salvatore Cangialosi

[57] ABSTRACT

A computer system having a power-on password stored in non-volatile memory wherein entry of the power-on password by a system manager permits access to all of the computer functions. The system also has the facility of at least one additional password held in non-volatile memory, wherein entry of the additional password by a user permits the system to boot in a manner preselected by the system manager. Preferably there are available a plurality of additional passwords providing at least two different levels of security access to the system.

6 Claims, 4 Drawing Sheets

COMPUTER SYSTEM SECURITY DEVICE

TECHNICAL FIELD

The present invention relates to a computer system having multiple levels of security access, and in particular to those computer systems having a power-on password.

BACKGROUND OF THE INVENTION

IBM Technical Disclosure Bulletin Volume 30 No. 5 October 1987 at pages 57 and 58 discloses a security system for a personal computer. Personal computers such as, for example, the IBM Personal System/2 (IBM and Personal System/2 are trademarks of International Business Machines Corporation) range of computers are provided with a power-on password facility to prevent use of the computer by unauthorized persons; in this case an unauthorized person is a person not knowing the power-on password. In the IBM Personal System/2 range of computers the power-on password is held non-volatile (battery powered) CMOS Random-Access Memory ("RAM").

The power-on password facility provided on the IBM Personal System/2 personal computers is limited to a single password, and once a person has access to that password the full facilities of the computer are available to that person.

It would be desirable to provide access to the computer for a plurality of users and also provide different levels of access to the facilities of the computer. In particular it is desirable to have a computer system in which the way the system boots up after power-on or system reset has been predetermined at the stage of set up and configuration of the system by a system manager or similar such control person. The term "boot" refers to initial program load into the computer memory. In the case of computer systems which are capable of booting from multiple devices (i.e. from diskette, fixed disk or the like), when the system is switched on initially, a boot (sometimes referred to as bootstrap) program is initialized to load the operating system from a reserved area on the media (this may be on the floppy diskette, fixed disk or remote device) and load the operating system. The boot routine is held in the system's Read Only Memory ("ROM") and it is automatically entered after switching on the system or is activated upon acceptance of the user entered power-on password.

In prior art computer systems, password access to the system facilities is activated after the operating system has been loaded. Unauthorized access is possible before the operating system has been loaded by using an alternative boot up program. Once the unauthorized user has succeeded in booting up the system all facilities of the system are vulnerable to misuse.

In order to illustrate the problem of the prior art one may consider the precautions being taken by computer system managers to prevent contamination by computer viruses and the like. A personal computer is conventionally restricted to a single user by a conventional physical key lock or a power-on/configuration password as described above. Any user having such access has unrestricted access and may use the diskette drive if fitted. The most common source of computer viruses is from a diskette contaminated with the virus, either deliberately or as a result of inadequate screening of stored programs and data on diskette made available to the user.

Prior art multi-access computer systems are configured to attempt to boot up from the diskette drive (provided a suitable diskette is inserted) or, if not possible from diskette, to attempt boot up from other storage media eg the fixed disk or remote device. It is clear that allowing an unauthorized user access to an activated diskette drive could allow that user to introduce a computer virus stored on a diskette; the prior art systems which only prevent access to unauthorized operators once the machine has booted up may have already been contaminated with a computer virus before the operating system password control security system is in operation.

DISCLOSURE OF INVENTION

Accordingly the present invention provides a computer system having a power-on password stored in non-volatile memory wherein entry of the power-on password by a system manager permits access to all of the computer functions, thereby permitting the system manager to configure the system, characterized in that at least one additional password is held in non-volatile memory and wherein entry of the additional password by a user permits the system to boot in a manner preselected by the system manager.

The computer system may be a stand-alone personal computer or workstation, or may be linked to other personal computers or workstations and/or mainframe or micro computers by a network.

Suitably there are available a plurality of additional passwords, in particular at least two classes of additional password are provided, each of the classes of additional password providing a different level of security access to the system.

At least one of the different levels of access preferably disables all input devices permitting uploading or downloading of programs or data from diskette, magnetic tape or like storage media, thereby preventing the user from copying material onto or from the system.

In a preferred embodiment of the present invention the power-on password and the additional password(s) are stored as keyboard scan codes in non-volatile CMOS RAM, such as for example battery powered CMOS RAM. The passwords are suitably seven characters in length with a checksum character.

A computer system particularly suited for use of the present invention is a personal computer, such as the IBM Personal System/2 Model 50, 55, 70 or 80 having a diskette drive and a fixed disk.

The preferred configuration of a computer system of the invention is one wherein entry of the additional password causes the diskette drive boot facility or other devices to be disabled. The additional password(s) used in such a system may be stored in non-volatile RAM or on a sector of the fixed disk; the sector chosen will be a sector which is not accessed in normal use of the user data on the fixed disc.

As an additional particularly preferred security feature for the computer system, failure by an user to enter a correct password within three attempts causes the system to require the power to be turned off and on again by the user before a further attempt to enter a password can be made.

In a further embodiment of the present invention there is provided a method of configuring a computer system to restrict boot up of the system to a manner preselected by a system manager having knowledge of a power-on password, said password permitting the system manager to access all facilities of the system to enable configuration of the system and installation of appropriate additional password authorization.

One way of carrying out the invention is described below with reference to the accompanying drawings which illustrate a preferred embodiment of the invention.

DESCRIPTION OF THE PREFERRED EMBODIMENT

Figure 1:
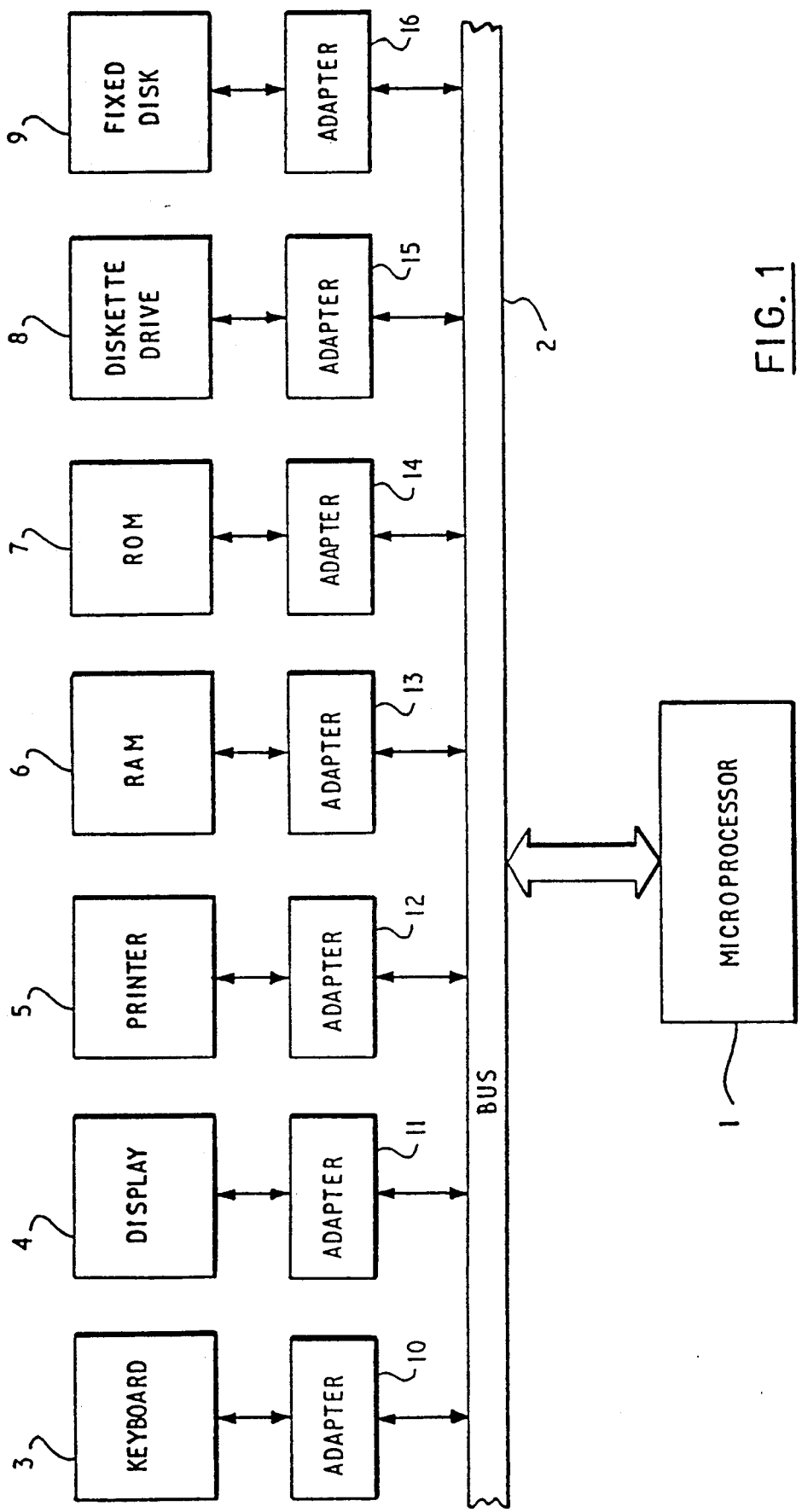
FIG. 1 is a schematic block diagram of a data processing system on which the invention may be implemented.

FIG. 1 illustrates a typical hardware set-up, such as the IBM Personal System/2 computer, on which the present invention may be implemented. The data processing system comprises a microprocessor 1 such as, for example the Intel 80386 or similar microprocessor, which is connected to a system bus 2, which comprises a set of data lines, a set of address lines and a set of control lines. A plurality of I/O devices including user input means (e.g. a keyboard 3), display 4, printer 5, random access memory 6, read only memory 7, storage media (eg diskette drive 8 and fixed disk 9), are connected to the bus via respective 10 through 16.

An operating system, such as for example IBM PC DOS or Operating System/2 (Operating System/2 is a trademark of International Business Machines Corporation) may be loaded from the storage media 8, 9 into memory 6 to provide instructions to the microprocessor 1. The loading of the operating system is activated by the boot program held in ROM. The operating system may be loaded from either the fixed disk 9 or from a diskette inserted in the diskette drive 8. Conventionally the system first checks to see whether an appropriate diskette is present in the diskette drive, and if present attempts a load from the diskette; if no diskette is present the system attempts to load from the fixed disk drive or remote device.

An application program subsequently loaded into the system will run in conjunction with the operating system to enable the data processing system to perform the application program tasks.

In the IBM Personal System/2 range of computers the power-on password is held in non-volatile (battery powered) CMOS RAM with an eight byte location allocated to the password and its check character. The microprocessor can only access these eight bytes during the Power-On Self Test ("POST"). Once a password has been installed and POST has been completed the password bytes are locked by a hardware latch, it is not then possible for the processor to access the password bytes. To reset the hardware latch it is necessary to turn off the system power, and then turn it on again. The power-on password is only known to the system manager or similar such control person who in addition has access to the internal physical structure of the system via a conventional keylock to permit opening or closing of the covers on the system unit, and access to the internal components of the system.

Upon switching on the personal computer the processor carries out the normal POST checks, including scanning the available Read Only Memory ("ROM") and Random Access Memory ("RAM").

Figure 2:
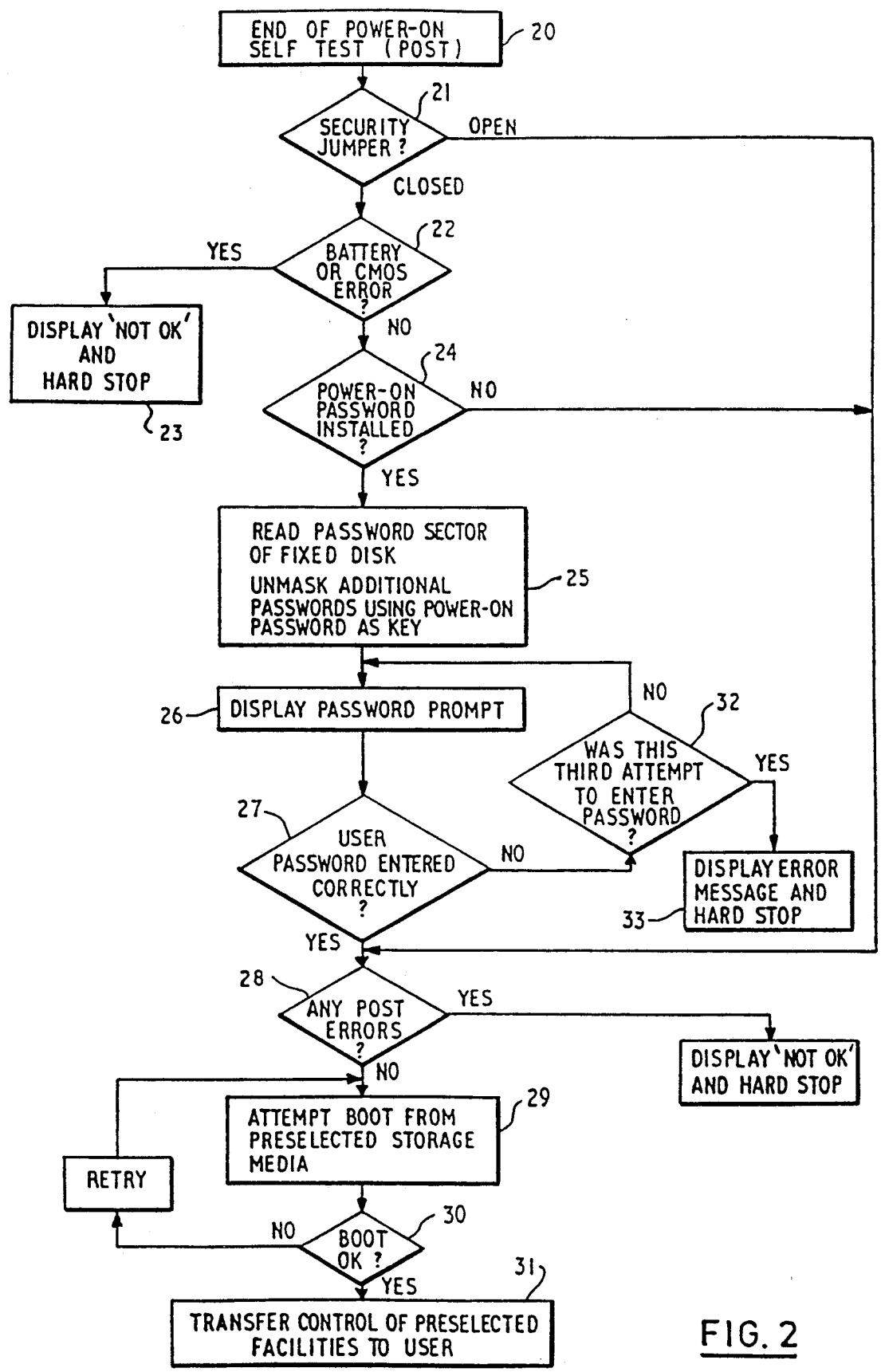
FIG. 2 is a flow chart of the logical operation of the processor in the operation of an embodiment of the invention having a single additional password.

Referring now to the flow chart of FIG. 2, on exiting POST at 20 the system checks at 21 that the security jumper (hard wired switch or contact breaker) on the system unit is closed and, if closed determines at 22 whether the non-volatile CMOS RAM is functioning correctly. Should the non-volatile CMOS RAM not be functioning, for example because the battery powering it has insufficient power, the computer displays at 23 an error message and prevents further input from the user.

Provided the CMOS RAM is functioning correctly the processor checks at 24 whether a power-on password has previously been installed in the CMOS RAM.

The presence of the master power-on password in CMOS RAM at 25 triggers the system to read at 25 a sector of the storage media 9 (FIG. 1), in this case the fixed disc, upon which any additional passwords are stored. As an additional security feature the additional passwords are stored in an masked form by applying an algorithm produced from the values contained within the installed master power-on password. The system will be programmed to ensure that an additional password identical to the power-on password cannot be installed.

In addition, at step 26 the computer displays an invitation to the user to enter the (additional) password; should the user wish to change the password a suitable combination of present and desired passwords is entered. The additional password keyed into the system by the user is checked by the system at 27 to determine whether the character sequence is acceptable. The steps of masking and unmasking of the passwords are carried out by conventional methods.

Provided there have been no POST errors 28 which must be dealt with by a user prior to use of the computer, the processor attempts boot up at 29 from a preselected portion of the system's storage media; such storage may include all or part of the fixed disc 9 (FIG. 1), or a diskette inserted by the user in the diskette drive 8 (FIG. 1). Provided boot was successfully carried out 30, control of those facilities of the system preselected by the system manager is transferred to the user at 31. If boot was unsuccessful for some reason the system repeats operation 29.

An additional security feature is shown on the flow chart at 32. Should the user input an incorrect password at 27 the system permits further attempts: however, only a total of three incorrect entries are permitted at 32. If a third attempt to enter the password is found to be unsuccessful at 32, the system displays at 33 an error message and prevents further input from the user until the system has been powered off and on again.

It will be seen from FIG. 2 that if the power-on password is disabled (security jumper open at 21) or not installed 24, the system is insecure and boot is possible without entry of a password. The system will, of course, be in this condition until the system manager initially sets up the system and installs the power-on password.

Figure 3A:
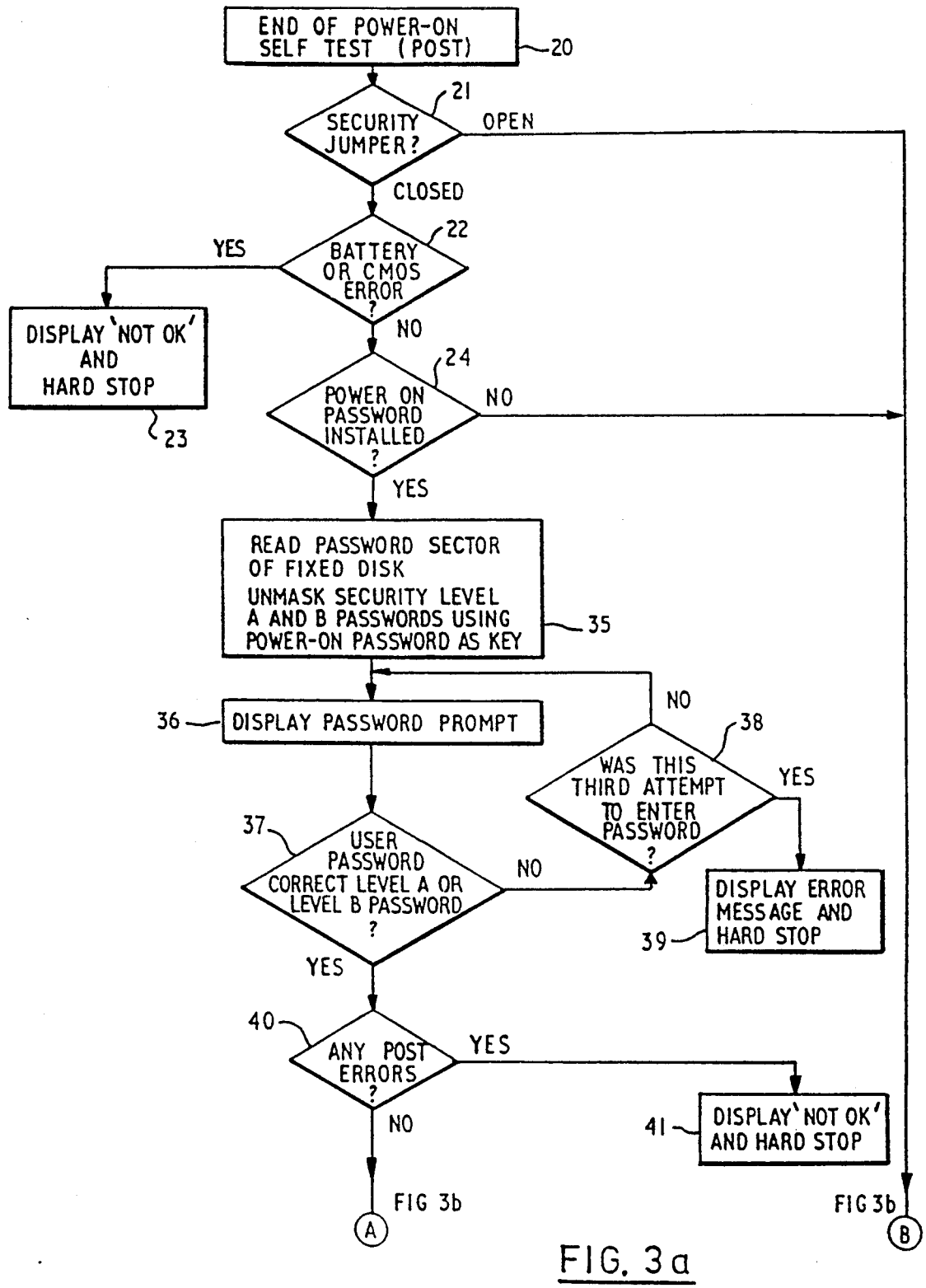
FIG. 3 (divided for convenience into FIGS. 3a and 3b) is a flow chart of the logical operation of the system in the operation of an embodiment of the invention having two classes of additional password, each of the classes of additional password providing a different level of access to the system.
Figure 3B:
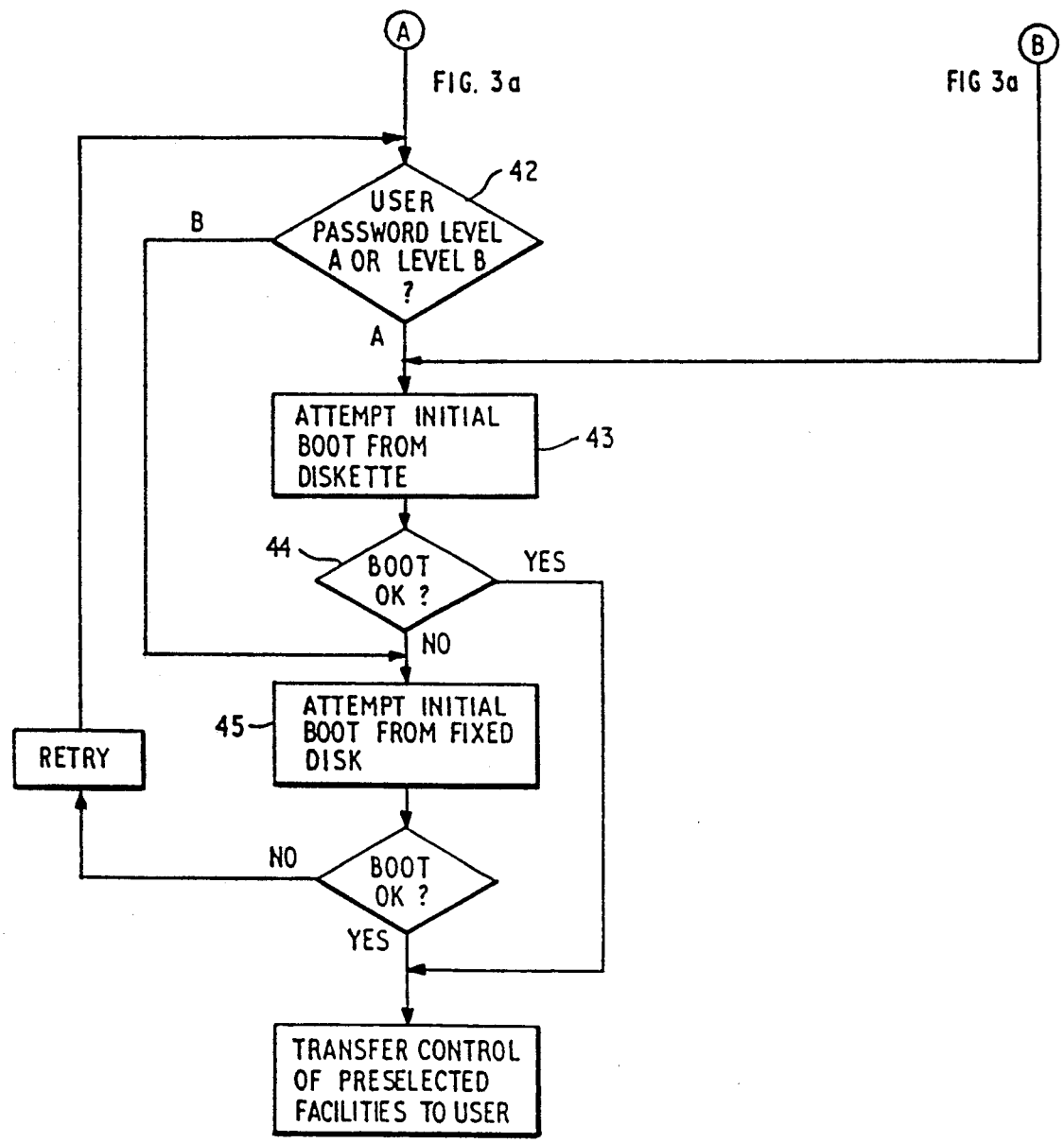

Referring now to the flow chart of FIG. 3 which illustrates an embodiment of the present invention having two classes of additional password, each of the classes of additional password providing a different level of access to the system.

The initial steps (20 to 24) in the flow chart are identical to those in the flow chart of FIG. 2.

The system reads at 35 (FIG. 2) the password sector of the fixed disk and unmasks the security level A and security level B passwords using the master power-on password as the key. A password prompt is displayed at 36 and provided a password, whether level A or B, is entered correctly by the operator and is accepted at 37, progress towards satisfactory boot up continues. The system is programmed to ensure that when multiple passwords are installed, it is not possible for a password character sequence to be repeated.

The number of attempts to enter a password is limited to three by steps 38 and 39.

POST errors are dealt with at 40 and 41.

The system checks at 42 whether a security level A or a security level B password was entered by the user. A security level A user password is a trigger to the system to attempt at 43 the initial boot from a diskette inserted in the diskette drive, whereas a security level B user password triggers the system to attempt at 45 the initial boot from the fixed disk. Successful boot at 43 or 45 allows the system to transfer control to the user of those system facilities selected by the system manager. It will be clear that the holder of a security level B password has a more limited range of access to the system than the holder of a level A password, for example the level B password would be given to a user to ensure that the user could not contaminate the system with a virus held on a diskette.

Should the system not boot successfully from diskette at 44, boot is attempted from the fixed disk at 45 thus permitting the level A password holder access to some but not all of the system facilities the system manager has preselected. Should the system not boot successfully from the fixed disk the system returns to 42.

Reference has been made in the specific embodiments to the operation of the system following power-on; the operation of the system following system reset may be similar or may suitably be blocked to prevent system reset. (System reset for the personal computer is activated by simultaneous depression of the Ctrl, Alt, and Del keys on the keyboard).

Although a particular example of the invention has been described, it will be appreciated that modifications and additions are possible within the scope of the invention.

We claim:

1. A microcomputer comprising:
   a microprocessor,
   a plurality of I/O devices operatively associated with said microprocessor for accomplishing computer functions, said plurality of I/O devices comprising non-volatile memory operatively associated with said microprocessor, a diskette drive and a fixed disk,
   a master password stored in said non-volatile memory and operative in association with said microprocessor and said I/O devices for controllably permitting access to functions of the microcomputer, and
   a plurality of additional passwords stored on a sector of said fixed disk, said plurality of additional passwords comprising at least two classes of additional passwords, each class of additional passwords providing a different level of access to functions of the microcomputer, said additional passwords each being operative in association with said microprocessor, said I/O devices and said master password for controllably permitting access to preselected functions of the microcomputer, said preselected functions being less than all of the functions of the microcomputer,
   said diskette drive normally enabling the loading of programs and data from removable storage media such as a diskette and at least one of the classes of additional passwords disabling all I/O devices from the loading of programs and data from removable storage media.

2. A microcomputer according to claim 1 wherein said non-volatile memory comprises non-volatile random access memory.

3. A microcomputer according to one of claims 1 and 2 wherein at least one of said additional passwords is stored in masked form.

4. A microcomputer according to one of claims 1 and 2 wherein at least one of said additional passwords controllably disables said diskette drive from the loading of programs and data.

5. A microcomputer according to any one of claims 1 through 4 wherein said microprocessor permits a user to make multiple attempts at entry of a correct password and responds to failure by a user to enter a correct password within a predetermined number of attempts by requiring power to the microcomputer to be turned off and then on again before a further attempt to enter a password can be made.

6. A method of protecting a microcomputer system against unauthorized use comprising the steps of:
   providing a microcomputer having a microprocessor and a plurality of I/O devices operatively associated with the microprocessor for accomplishing computer functions, including providing at least one device normally for loading programs and data from removable storage media such as a diskette,
   storing in non-volatile memory operatively associated with the microprocessor a master password operative in association with the microprocessor and I/O devices for controllably permitting access to functions of the microcomputer,
   storing in the non-volatile memory a plurality of additional passwords, each of said additional passwords being associated with a corresponding preselected pattern of permitted functions of the microcomputer and operative in association with the microprocessor, I/O devices and master password for controllably permitting access to said corresponding preselected functions of the microcomputer, said preselected functions being less than all of the functions of the microcomputer,
   masking each of said additional passwords through application of an algorithm based upon the master password,
   dividing the stored plurality of additional passwords into a plurality of classes, each class being associated with a corresponding level of access to permitted functions of the microcomputer,
   arranging one of the plurality of classes to disable all I/O devices otherwise for loading programs and data from removable storage media for precluding the loading of programs and data from removable storage media, and
   responding to the entry by a prospective user of a stored additional password by enabling usage of preselected functions of the microcomputer.

* * * * *